United States Patent [19]

Chu et al.

[11] Patent Number: 4,818,738

[45] Date of Patent: Apr. 4, 1989

[54] HIGH EQUILIBRIUM ACTIVITY ADDITIVE CATALYST FOR CATALYTIC CRACKING

[75] Inventors: Pochen Chu, West Deptford; Sadi Mizrahi, Cherry Hill, both of N.J.

[73] Assignee: Mobil Oil Corp., New York, N.Y.

[21] Appl. No.: 130,491

[22] Filed: Dec. 9, 1987

[51] Int. Cl.4 .......................... B01J 29/04; B01J 29/06
[52] U.S. Cl. ......................................... 502/67; 502/68
[58] Field of Search ................................... 502/68, 67

[56] References Cited

U.S. PATENT DOCUMENTS

| | | | |
|---|---|---|---|
| 3,140,249 | 7/1964 | Plank et al. | 208/120 |
| 3,140,251 | 7/1964 | Plank et al. | 208/120 |
| 3,140,252 | 7/1964 | Frilette et al. | 208/120 |
| 3,140,253 | 7/1964 | Plank et al. | 208/120 |
| 3,271,418 | 9/1966 | Plank et al. | 208/120 |
| 3,758,403 | 9/1973 | Rosinski et al. | 208/120 |
| 3,769,202 | 10/1973 | Plank et al. | 208/111 |
| 3,894,931 | 7/1975 | Nace et al. | 208/73 |
| 3,894,933 | 7/1975 | Owen et al. | 208/77 |
| 3,894,934 | 7/1975 | Owen et al. | 208/78 |
| 4,368,114 | 1/1983 | Chester et al. | 208/120 |

Primary Examiner—Carl F. Dees
Attorney, Agent, or Firm—Alexander J. McKillop; Charles J. Speciale; Robert B. Furr, Jr.

[57] ABSTRACT

Octane and improvement in catalytic cracking processes can be attained by the addition to conventional cracking catalysts of small amounts of additive catalyst comprising a class of zeolites characterized by a silica to alumina mole ratio greater than about 12 and a Constraint Index of about 1 to 12 bound in a matrix chosen such that the matrix component forms a thermodynamically favored compound with selected cations. Sustained catalytic activity is achieved by pre-exchanging the catalyst to a high level of selected cation loading. By extending the active life of the additive catalyst, markedly lower makeup catalyst addition rates are required.

18 Claims, No Drawings

HIGH EQUILIBRIUM ACTIVITY ADDITIVE CATALYST FOR CATALYTIC CRACKING

FIELD OF THE INVENTION

This invention relates to an improved process to increase gasoline octane number in catalytic cracking units by the addition of small amounts of additive catalyst to cracking catalysts. The active life of the additive catalyst is extended by exchanging a portion of the catalytically active sites with a cation selected such that the cationic form of the additive catalyst is thermodynamically favored under catalyst synthesis conditions and the hydrogen form of the catalyst is favored under catalytic cracking unit regenerator steaming conditions.

BACKGROUND OF THE INVENTION

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. The incorporation of a crystalline zeolite into a matrix for catalytic cracking is known and such disclosure appears in one or more of the above-identified U.S. patents.

In order to reduce automobile exhaust emissions to meet federal and state pollution requirements, many automobile manufacturers have equipped the exhaust systems of their vehicles with catalytic converters. These converters contain catalysts which are poisoned by tetraethyl lead. Tetraethyl lead has been widely used to boost the octane number of gasoline but may no longer be used. Refiners must now turn to alternate means to improve gasoline octane number.

One method of increasing octane number is to raise the cracking temperature. This method, however, is very limited, since many units are now operating at maximum temperatures due to metallurgical limitations. Raising the cracking temperature also results in increased requirements for the gas plant (i.e. gas compressor and separator). Since most gas plants are now operating at maximum capacity, any increased load could not be tolerated by the present equipment.

As can well be appreciated from the foregoing, it would be extremely desirable to have a process which will provide high octane unleaded gasoline without undue sacrifice of gasoline yield. It would be even more desirable if such results could be obtained in conjunction with a marked reduction in the use of expensive additive catalysts.

It is also known that improved results will be obtained with regard to the catalytic cracking of gas oils if a crystalline zeolite having an intermediate pore size is included with a crystalline zeolite having a large pore size, either with or without a matrix. A disclosure of this type is found in U.S. Pat. No. 3,769,202.

Improved results in catalytic cracking with respect to both octane number and overall yield were achieved in U.S. Pat. No. 3,758,403. In said patent, the cracking catalyst was comprised of a large pore size crystalline zeolite in admixture with ZSM-5 type zeolite wherein the ratio of ZSM-5 type zeolite to large pore size crystalline zeolite was in the range of 1:10 to 3:1.

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite in the range of 1:10 to 3:1.

It is known that the addition of a very small amount of a medium-pore sized zeolite additive catalyst to conventional cracking catalysts results in a significant improvement in the octane number of the resultant gasoline while increasing the total yield comprised of $C_5^+$ gasoline and alkylate. U.S. Pat. No. 4,368,114 teaches this process, details its use in a fluidized catalytic cracking plant and is incorporated by reference as if set forth at length herein.

Before the advent of the present invention, it was accepted in the industry that a certain amount of catalytic activity was lost due to steaming during each catalyst regeneration. Additive catalyst addition rates were based on the rate of deactivation. The present unexpected discovery, however, will dramatically reduce the amount of catalytic activity lost during regeneration and will therefore reduce the additive catalyst makeup requirements.

SUMMARY OF THE INVENTION

In accordance with the present invention, there has now been discovered an improved process to upgrade the octane number in catalytic cracking units while markedly reducing makeup additive catalyst requirements.

The additive catalyst of this invention comprises a class of zeolites which are characterized by a silica to alumina mole ratio of at least 12, having at least 10% of the exchangeable cation sites occupied by selected cations, preferably between 25 and 75% of the exchangeable cation sites occupied by selected cations, and a Constraint Index, as hereinafter described, of about 1 to 12. Cations useful in the present invention must first be sufficiently small to enter the pores of the zeolite catalyst to be exchanged. Second, the cationic form of the zeolite catalyst must be thermodynamically favored under the cation loading conditions for the particular zeolite while the hydrogen form of the zeolite catalyst is favored under catalytic cracking unit regenerator steaming conditions. Examples of such cations include the alkali metal cations, alkali earth cations, and transition metal cations.

The additive catalyst is bound in a matrix chosen such that the matrix component forms a thermodynamically favored compound with the selected cations under catalytic cracking unit regenerator steaming conditions. Aluminosilicate clays, for example, kaolin clays, are useful as matrix materials in the present invention. Clays which do not contain alumina, on the other hand, are not useful as matrix materials in the present invention. Some acid sites are generated during each regeneration cycle as the cation migrate and are irreversibly trapped by the matrix component. The net effect of this timed release is increased catalyst life and, consequently, reduced catalyst make-up requirements.

The improved process of this invention affords the refiner greater flexibility and economy in catalytic cracking operation, since only a very small quantity of additive catalyst can quickly boost the octane number of the product. The need for only very small quantities of this makeup additive catalyst will also result in great savings in catalyst usage and will therefore result in more economic refinery operations.

DETAILED DESCRIPTION

Addition of a separate additive catalyst comprising one or more members of a class of zeolites, as defined hereinafter, is extremely effective as an octane improver in very small amounts when used in conjunction with a conventional cracking catalyst. It has been found that the addition of a member of this class of zeolites to the conventional cracking catalyst in the unit under conventional cracking operations can increase octane. Octane increase can be varied with the content of the additive catalyst. The addition of the additive catalyst is useful to enhance octane at weight ratios of zeolite contained in the additive catalyst to cracking catalyst of between about 1:1000 and 1:10, preferably between weight ratios of between about 1:200 and 1:20 zeolite contained in the additive catalyst to cracking catalyst. If excess alkylation capacity is available, $C_5+$ gasoline plus alkylate yields are higher when the additive catalyst is utilized as compared to conventional commercial cracking catalysts, without sacrificing the octane increase.

The additive catalyst can be injected at any time during the catalytic cracking process. The additive catalyst can be introduced while the cracking unit is down, or while the cracking unit is on stream operation. Once the additive catalyst is added to the cracking process, the refiner can return to conventional operation or an operation at lower octane number by eliminating or decreasing the use of additive catalyst. Thus the increase in octane number over the number obtainable under conventional cracking operations can be controlled by controlling the amount of additive catalyst.

Catalytic cracking units which are amenable to the process of this invention operate within the temperature range of about 600° F. to 1300° F. and under reduced atmospheric or superatmospheric pressure. The catalytic cracking process may be operated batchwise or continuously. The catalytic cracking process can be either fixed bed, moving bed or fluidized bed and the hydrocarbon charge stock flow may be either concurrent or countercurrent to the conventional catalyst flow. The process of this invention is particularly applicable to the fluid catalytic cracking (FCC) process.

The amount of additive catalyst required to increase gasoline octane number is generally based on the total quantity of conventional cracking catalyst in the unit, i.e. on the circulating inventory of conventional cracking catalyst. For example, if the additive catalyst is first introduced via the addition of fresh makeup catalyst, the amount of zeolite constituent in the additive catalyst required would be quite high if compared against the amount of fresh makeup catalyst added. However, after a period of time of fresh makeup catalyst addition, and once the amount of zeolite in the additive catalyst is maintained at the prescribed limits as compared to the circulating inventory of conventional cracking catalyst, the amount of the zeolite in the fresh makeup catalyst addition will be much lower than initially. In actual operation, because the catalytic activity of the circulating inventory of catalyst tends to decrease with age, fresh makeup catalyst is added to maintain optimal catalyst activity.

Hydrocarbon charge stocks undergoing cracking in accordance with this invention comprise hydrocarbons generally and, in particular, petroleum fractions having an initial boiling point range of at least 400° F., a 50% point range of at least 500° F. and an end point range of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The members of the class of zeolites of the additive catalyst constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

The additive catalysts referred to herein utilize members of a class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e. high silica to alumina mole ratios, they are very active even with silica to alumina mole ratios exceeding 30. This activity is surprising, since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful in the additive catalysts of this invention possess, in combination: a Constraint Index, as hereinafter defined, of about 1 to 12, a silica to alumina mole ratio of at least about 12, and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels.

Although additive catalysts comprising zeolites with a silica to alumina mole ratio of at least about 12 are useful, it is preferred to use zeolites having higher ratios of at least about 30. In some zeolites, the upper limit of silica to alumina mole ratio is unbounded, with values of 30,000 and greater, extending at least theoretically up to infinity. Therefore, the silica to alumina mole ratio of the zeolite component of the additive catalyst for use herein may be from about 12 to infinity, preferably from about 30 to infinity. Such zeolites, after activation, acquire an intracrystalline sorption capacity for normal hexane which is greater than that for water, i.e. they exhibit "hydrophobic" properties. It is believed that this hydrophobic character is advantageous in the present invention.

The zeolites comprising the additive catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Additive catalysts with zeolites with windows of 10-member rings are preferred, although excessive puckering or pore blockage may render these zeolites substantially ineffective.

Additive catalysts comprising zeolites with windows of 12-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constraint access, a simple determination of the "Constraint Index" may be made. U.S. Pat. No. 4,016,218 details the significance of and the procedure for determining Constraint Index and is incorporated by reference as if set forth at length herein. U.S. Pat. No. 4,696,732 details typical values of the Constraint Index for various zeolites and is incorporated by reference as if set forth at length herein.

The additive catalysts of this invention may be prepared in various ways. The additive catalyst may be separately prepared in the form of particles such as pellets or extrudates, for example, and simply mixed in the required proportions. The particle size of the individual component particles may be quite small, for example from about 20 to about 150 microns, when intended for use in fluid bed operation, or they may be as large as up to about ½ inch for fixed bed operation. Or the components may be mixed as powders and formed into pellets or extrudate, each pellet containing both components in substantially the required proportions.

As is the case of many catalysts, it is desirable to incorporate the zeolite component of the additive catalyst in a matrix. Such matrix is useful as a binder and imparts greater resistance to the catalyst for the severe temperature, pressure and velocity conditions encountered in many cracking processes.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, zeolite materials have been incorporated into naturally occurring clays, e.g. bentonite and kaolin.

In addition to the foregoing materials, the zeolite for use herein can be composited with a porous matrix material such as silica-alumina, silica-magnesia, silica-zirconia, silica-thoria, silica-beryllia, silica-titania, as well as ternary compositions such as silica-alumina-thoria, slicia-alumina-zirconia, silica-alumina-magnesia and silica-magnesia-zirconia. The matrix can be in the form of a cogel. A mixture of clay in combination with silica or any of the above specified cogels to form a matrix may also be used.

Cracking catalysts contain active components which may be zeolitic or non-zeolitic. The non-zeolitic active components are generally amorphous silica-alumina and crystalline silica-alumina. However, the major conventional cracking catalysts presently in use generally comprise a crystalline zeolite (active component) in a suitable matrix. Representative crystalline zeolite active component constituents of cracking include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including faujasite, mordenite, and the like. Preferred crystalline zeolites include the synthetic faujasite zeolites X and Y, with particular preference being accorded zeolite Y.

In the present invention, cations are exchanged with some of the hydrogen sites inside the pores of the zeolite catalyst. The particular cations to be exchanged must be selected to be compatible with the zeolite catalyst. First, the cations must be small enough to enter the pores of the zeolite to exchange with the available sites. Second, the cationic form of the zeolite must be preferred over the hydrogen form under cation loading conditions for the particular zeolite while the hydrogen form of the zeolite catalyst is favored under catalytic cracking unit regenerator steaming conditions. Examples of cations which are useful for exchange with various zeolites include the alkali metal cations, alkali earth cations, and transition metal cations.

The crystalline zeolite additive is prepared by exchanging from 10 to 100% of the catalytically active acid sites with cations selected as described above. The cations protect the bulk of the acid sites from deactivation during steaming of the catalytic cracking unit regenerator. At the same time a portion of the cations migrate from the crystalline zeolite to the matrix thereby releasing some acid sites for reaction in the catalytic cracking unit riser section. This cation movement is possible because the cation is chosen such that the hydrogen form of crystalline zeolite is favored under regenerator steaming conditions. The cations are irreversibly trapped in the catalyst matrix by a component (e.g. clay, silica, or metal oxides) chosen such that the matrix component forms a thermodynamically favored compound with the cation under catalytic cracking unit regenerator steaming conditions. This process repeats as the cations gradually move from the crystalline zeolite to the matrix with each pass through the regenerator. The net effect is a sustained release of crystalline zeolite acid activity. Although the cation exchange results in somewhat lower initial catalyst activity, the additive maintains its activity for a longer time. This reduces the make-up requirement.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in matrix formulation.

Where a matrix is used, content of catalytically active component, e.g. crystalline zeolite, i.e. the amount of the zeolite Y component, in the conventional cracking catalyst, is generally at least about 5 weight percent, and more particularly between about 5 and about 50 weight percent. Ion exchange of the zeolite to replace its initial cation content can be accomplished either prior to or subsequent to incorporation of the zeolite into the matrix.

Where no matrix as such is used, such as where a non-zeolitic cracking catalyst, e.g. silica-alumina, is used, content of catalytically active component will, of course, approach 100 weight percent. Also, since silica-alumina may serve as a matrix material for catalytically active zeolite component, 100 weight percent catalytically active catalyst may exist.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

The following examples will serve to illustrate the invention.

EXAMPLE 1

This example will illustrate the catalytic cracking of a gas oil with a cracking catalyst. There is no additive catalyst used in this example. A sample of equilibrium REY catalyst was tested in a fixed fluidized-bed reactor with a sour heavy gas oil, (properties given in Table 1). The performance of this catalyst was used as a base case for comparison with ZSM-5 containing catalyst samples. The results are shown in Table 2.

TABLE 1

| Chargestock | Sour Heavy Gas Oil |
|---|---|
| Gravity, °API | 24.3 |
| Aniline Pt., °F. | 171 |
| Sulfur, wt. % | 1.87 |
| Nitrogen, wt. % | 0.10 |
| Basic Nitrogen, ppm | 327 |
| Conradson Carbon, wt. % | 0.28 |
| Viscosity, KV at 210° F. | 3.6 |
| Bromine No. | 4.2 |
| R.I. at 70° F. | 1.5080 |
| Hydrogen, wt. % | 12.3 |
| Molecular Weight | 358 |
| Pour Point, °F. | 85 |
| Paraffins, wt. % | 23.5 |
| Naphthenes, wt. % | 32.0 |
| Aromatics, wt. % | 44.5 |
| $C_A$, wt. % | 18.9 |

TABLE 2

| Catalyst | Equil. REY |
|---|---|
| Conversion, vol. % | 65 |
| $C_5^+$ Gasoline Yld, vol. % | 50.4 |
| RON + O | 89.5 |
| i-$C_4$ + $C_3^=$ + $C_4^=$, vol. % | 20.2 |
| $C_3$-Gas, wt. % | 7.4 |

EXAMPLE 2

This example will serve to illustrate the beneficial effects of the additive catalyst in conventional cracking processes. A 25 wt. % ZSM-5 additive sample in a kaoline clay containing matrix (0.1 wt. % Na) was steamed at 1450° F. for 10 hours under atmospheric pressure with a 45/55 steam air mixture. An 8 wt. % blend of this catalyst and the equilibrium REY catalyst described in Example 1 was tested in a fixed fluidized-bed bench unit with the sour heavy gas oil shown in Table 1. The 8 wt. % blend of this composite catalyst represents a zeolite additive catalyst to cracking catalyst weight ratio of 1:50. The results are shown in Table 3 with changes from the base case of Example 1, Table 2 designated by "Δ".

TABLE 3

| Catalyst | Equil. REY + ZSM-5 |
|---|---|
| Conversion, vol. % | 65 |
| $C_5^+$ Gasoline Yld, vol. % | 47.5 |
| RON + O | 90.8 |
| i-$C_4$ + $C_3^=$ + $C_4^=$, vol. % | 23.9 |
| $C_3$-Gas, wt. % | 8.9 |
| Coke, wt. % | 4.5 |
| Gasoline + Alkylate, vol. % | 76.1 |
| ΔGasoline, vol. % | −2.9 |
| ΔRON + O | +1.3 |
| Δ(i-$C_4$ + $C_3^=$ + $C_4^=$), vol. % | +3.7 |

EXAMPLE 3

This example will serve to illustrate the beneficial effects of the additive catalyst of this invention in conventional catalytic cracking processes. The 25 wt. % additive described in Example 2 was impregnated with 0.54 wt. % sodium added to the catalyst as a sodium nitrate solution in water. The catalyst was then steamed as in Example 2, blended with the equilibrium REY base case catalyst and evaluated with the sour heavy gas oil as described above. The results are shown in Table 4 with changes from the base case of Example 1, Table 2 designated by "Δ".

TABLE 4

| Catalyst | Equil. REY + Na ZSM-5 |
| --- | --- |
| Conversion, vol. % | 65 |
| $C_5^+$ Gasoline Yld, vol. % | 46.1 |
| RON + O | 91.4 |
| $i\text{-}C_4 + C_3^= + C_4^=$, vol. % | 25.2 |
| $C_3$-Gas, wt. % | 8.9 |
| Coke, wt. % | 4.8 |
| Gasoline + Alkylate, vol. % | 76.4 |
| ΔGasoline, vol. % | −4.3 |
| ΔRON + O | +1.9 |
| $\Delta(i\text{-}C_4 + C_3^= + C_4^=)$, vol. % | +5.0 |

Relative to the base case, the catalyst in Example 3 gave a higher octane boost, higher $i\text{-}C_4 + C_3^= + C_4^=$ yield and a lower gasoline yield than the catalyst in Example 2. This indicates that Na exchange prior to steaming stabilized the ZSM-5 additive. As shown in Example 3, the sodium cations provide protection against catalyst deactivation resulting from steaming during regeneration.

What is claimed is:

1. A catalyst composition for the catalytic cracking of a hydrocarbon feedstock comprising:
   (i) a large pore size cracking catalyst, and
   (ii) an additive catalyst comprising a crystalline zeolite having a Constraint Index of from about 1 to about 12 and having at least 10% of the exchangeable cation sites occupied by cations, said cations selected such that the cationic form of said zeolite is thermodynamically favored at cation loading conditions and the hydrogen form of said zeolite is thermodynamically favored under catalytic cracking unit regenerator steaming conditions, said zeolite bound in a matrix chosen such that the matrix component forms a thermodynamically favored compound with said cations under catalytic cracking unit regenerator steaming conditions.

2. A catalyst composition for the catalytic cracking of a hydrocarbon feedstock comprising:
   (i) a large pore size cracking catalyst, and
   (ii) an additive catalyst comprising a crystalline zeolite having a Constraint Index of from about 1 to about 12 and having at least 10% of the exchangeable cation sites occupied by alkali metal cations, bound in a matrix chosen such that the matrix component forms a thermodynamically favored compound with said alkali metal cations under catalytic cracking unit regenerator steaming conditions.

3. The catalyst composition of claim 2 wherein said additive catalyst further comprises a crystalline zeolite having between 25 and 75% of the exchangeable cation sites occupied by alkali metal cations.

4. The catalyst composition of claim 2 wherein said matrix comprises a clay.

5. The catalyst composition of claim 2 wherein said alkali metal cation is sodium.

6. The catalyst composition of claim 2 wherein said additive catalyst comprises ZSM-5.

7. The catalyst composition of claim 2 wherein the weight ratio of said zeolite contained in said additive catalyst to said cracking catalyst is between about 1:1000 and 1:10.

8. The catalyst composition of claim 2 wherein the weight ratio of said zeolite contained in said additive catalyst to said cracking catalyst is between about 1:200 and 1:20.

9. A catalyst composition for the catalytic cracking of a hydrocarbon feedstock comprising:
   (i) a cracking catalyst;
   (ii) an additive catalyst comprising a crystalline zeolite having a Constraint Index of from about 1 to about 12 and having at least 10% of the exchangeable cation sites occupied by cations, said cations comprising one or more selected from the group consisting of alkali metal cations, alkali earth cations and transition metal cations, said zeolite bound in a matrix comprising one or more selected from the group consisting of silica gels, cogels of silica and metal oxides, natural clays and synthetic clays.

10. The composition of claim 9 wherein said matrix comprises one or more selected from the group consisting of silica-alumina, silica-zirconia and silica-alumina-zirconia.

11. The catalyst composition of claim 9 wherein said matrix comprises a matrix selected from the group consisting of natural clays and synthetic clays.

12. The catalyst composition of claim 11 wherein said matrix comprises a kaolin clay.

13. The catalyst composition of claim 9 wherein said cracking catalyst comprises a zeolite catalyst having a Constraint Index of less than about 2.

14. The catalyst composition of claim 9 wherein said cracking catalyst comprises a zeolite catalyst having the structure of one or more selected from the group consisting of zeolite X, zeolite Y, mordenite and faujasite.

15. The catalyst composition of claim 9 wherein said additive catalyst comprises a zeolite having between 25 and 75% of the exchangeable cation sites occupied by alkali metal cations.

16. The catalyst composition of claim 9 wherein said additive catalyst comprises a zeolite catalyst having the structure of ZSM-5.

17. The catalyst composition of claim 9 wherein the weight ratio of said zeolite contained in said additive catalyst to said cracking catalyst is between about 1:1000 and 1:10.

18. The catalyst composition of claim 9 wherein the weight ratio of said zeolite contained in said additive catalyst to said cracking catalyst is between about 1:200 and 1:20.

* * * * *